United States Patent [19]

Bradshaw et al.

[11] Patent Number: 4,969,719
[45] Date of Patent: Nov. 13, 1990

[54] SMECTIC LIQUID CRYSTAL DEVICES

[75] Inventors: Madeline J. Bradshaw, Gloucestershire; Edward P. Raynes, Worcestershire, both of United Kingdom

[73] Assignee: The Secretary of State for Defence in Her Britannic Majesty's Governement of the United Kingdom of Great Britain and Northern Ireland, London, England

[21] Appl. No.: 279,555

[22] Filed: Dec. 1, 1988

Related U.S. Application Data

[63] Continuation of PCT GB87/00221 filed on Apr. 1, 1987, published as WO87/06021 on Oct. 8, 1987.

[30] Foreign Application Priority Data

Apr. 3, 1986 [GB] United Kingdom ............... 8608115

[51] Int. Cl.$^5$ ............................................. G02F 1/13
[52] U.S. Cl. .................. 350/350 S; 350/337; 350/340
[58] Field of Search ............... 350/350 S, 337, 350 R, 350/340

[56] References Cited

FOREIGN PATENT DOCUMENTS

| 0008956 | 1/1979 | European Pat. Off. |
| 0091637 | 4/1983 | European Pat. Off. |
| 0156726A | 6/1985 | European Pat. Off. |
| 016610302 | 9/1985 | European Pat. Off. |
| 8706020 | 10/1987 | United Kingdom ............ 350/350 S |
| 8706021 | 10/1987 | United Kingdom ............ 350/350 S |

*Primary Examiner*—Stanley D. Miller
*Assistant Examiner*—Huy K. Mai
*Attorney, Agent, or Firm*—Nixon & Vanderhye

[57] ABSTRACT

A liquid crystal display is arranged to provide very low minimum light transmission in one of its two switchable states. This makes it useful for a shutter (FIG. 1) and for high contrast digital displays (FIG. 2). A layer of a chiral smectic liquid crystal material is contained between two cell walls carrying electrode structures. The liquid crystal material has the following phases with temperature: isotropic⇌cholesteric⇌chiral smectic⇌solid. The cholesteric pitch is large. The cell walls are surface treated to provide a parallel alignment of liquid crystal molecules. Crossed polarizers are arranged either side of the cell walls, one aligned with its optical axis parallel to the surface alignment of the adjacent cell wall. The device is switched by means of ±-d.c. voltage pulses and utilizes the ferro electric effect.

15 Claims, 3 Drawing Sheets

SMECTIC LIQUID CRYSTAL DEVICES

This application is a continuation of International Application PCT/GB87/00221 filed Apr. 1, 1987, published as WO87/06021 on Oct. 8, 1987, which in turn has priority based upon GB Patent Application No. 86 08115 filed Apr. 3, 1986.

BACKGROUND OF THE INVENTION

1. Field of the Invention

The invention relates to smectic liquid crystal devices.

2. Discussion of Prior Art

Liquid crystal devices commonly comprise a thin layer of a liquid crystal material contained between two glass plates or walls. A thin transparent electrode is deposited on the inner face of both walls. The combination of liquid crystal layer, walls, and electrode is often termed a liquid crystal cell. When an electric field is applied between the two electrodes, liquid crystal molecules rotate in the field to an ON state. On removal of the field the molecules rotate back to an OFF state, determined by a surface treatment applied to the walls before cell assembly and by the type of liquid crystal material. The optical transmission characteristics of the ON and OFF states are different. Some devices need one or two polarizers and/or dyes to visibly distinguish between ON and OFF states.

There are broadly three different types of liquid crystal material, nematic, cholesteric, and smectic, each distinguished by a different molecular ordering.

Such materials only show a liquid crystal phase over a limited temperature range between the solid and isotropic liquid phases. Within the liquid crystal phase temperature range a material may exhibit one or more of the nematic, cholesteric or smectic phase types. Normally a material is chosen such that it forms only one type of liquid crystal phase over its working temperature range.

The present invention concerns devices using smectic liquid crystal materials.

Displays have been made with the electrodes formed into rows on one wall and columns on the other wall. These collectively form an x, y matrix of separately addressable elements on a large display. One type of display uses the ON and OFF states to form an electrically switchable optical shutter. Yet another type of display is used as an optical storage device. Nematic cholesteric and smectic liquid crystal material have been used for such devices. A problem with many displays is the time taken to switch between the two states i.e. the response times. For many displays a fast response time is needed. A nematic material, arranged in a 90° twisted structure typically has a response time of 100 milliseconds.

Devices comprising smectic materials have not been used as widely as devices with nematic or cholesteric materials. Available display devices based on smectic materials do not have the necessary characteristics. Recently however the smectic ferro electric property with its fast switching and bistability characteristics has become important see for example N. A. Clark & S. T. Lagerwall, App. Phys. Letters 36 (11) 1980 pp 899-901. Chiral liquid crystal materials in a tilted smectic phase, e.g. $S_C^*$, $S_I^*$, $S_F^*$, $S_H^*$, $S_J^*$, $S_G^*$, are known to exhibit ferroelectric properties. This has been described by R. B. Meyer, L Liebert, L. Strzelecki and P. Keller, J. de Physique (Lett), 36, L-69 (1975).

One problem with liquid crystal devices when used as a shutter is the amount of light that leaks through in its minimum transmission states. For example a twisted nematic cell may let through a minimum of about 1% of light. Reducing the minimum light transmission is highly desirable for shutter applications. Also it is useful in other displays for contrast enhancement. A further problem with twisted nematic displays and shutters is their narrow angle of view; when viewed away from the normal to a display the information displayed can be corrupted.

Ideally a liquid crystal shutter should have fast response times and a very low minimum light transmission. For a digital display the display should have high contrast and a wide angle of view.

SUMMARY OF THE INVENTION

The present invention overcomes some of the above problems to provide a fast shutter with low minimum light transmission by the smectic ferro electro property together with a careful alignment of the liquid crystal molecules and polarizers, and selection of liquid crystal material characteristics.

According to this invention a liquid crystal device capable of being switched into two states comprises a layer of a tilted chiral smectic liquid crystal crystal material contained between two cell walls each carrying electrodes and surface treated to give homogeneous alignment to the liquid crystal molecules, the alignment directions being parallel or near parallel and two polarizers arranged either side the cell wall faces and with the optical axis of one polarizer crossed with respect to the optical axis of the other polarizer and with optical axis of one polarizer parallel to liquid crystal molecular alignment in one of their switched states the liquid crystal material having a tilted chiral smectic phase at normal device operating temperatures and a cholesteric phase at a higher temperature, with a cholesteric pitch of at least the layer thickness in the cholesteric phase at least 0.1° C. above the cholesteric to smectic transition temperature, a substantial spontaneous polarization coefficient and the following phases with increasing temperatures: chiral smectic - cholesteric - isotropic.

The alignment directions on the two walls may be parallel in the same or opposite directions, i.e. parallel or antiparallel.

A method of making a liquid crystal display device according to this invention comprises the steps;

providing two cell walls spaced apart by a spacer to contain a layer of a liquid crystal material, the wall inner surfaces having formed thereon electrode structures and surface treated to provide a homogeneous liquid crystal alignment, providing a tilted chiral smectic liquid crystal material having a cholesteric phase at an elevated temperature between the chiral smectic and isotropic phases with a cholesteric pitch p greater than half the layer thickness d at a temperature at least 0.1° C. above a cholesteric to smectic transition temperature and a significant spontaneous polarization Ps in the chiral smectic phase, heating the mixture to the cholesteric phase, introducing and sealing the mixture into the space between the walls, cooling the material to the tilted chiral smectic phase arranging the cell walls between two linear polarizers with at least one polarizer having its polarization axis parallel to an adjacent molecular alignment direction.

The liquid crystal material may be a single component or a mixture of components. The material may combine one or more chiral components with laevo (left hand) cholesteric twist sense with one or more chiral components with dextro (right hand) cholesteric twist sense. With such a mixture none of the laevo components can be the racemates of the dextro components. This chiral mixture may be a chiral smectic itself or may be used as an additive to a non-chiral and/or racemate smectic liquid crystal host material. Alternatively the chiral component or components may have the same cholesteric twist sense providing the cholesteric pitch and Ps have the above values. The material has the following phases: isotropic - cholesteric (or nematic) - smectic*.

The smectic phase has at least one of the following chiral smectic phases C*, I*, F*, J*, G*, K*, H* depending on temperature.

The p/d ratio is large enough to prevent the material, in its cholesteric phase, adopting more than a $3\pi$ twist, ideally the pitch p is greater than 4 d, above the cholesteric to smectic phase transition, so that much less than $\pi$ twist can occur in the cholesteric phase near the transition. Ideally this value of p is large over the whole cholesteric phase, preferably is large for 5° C. above the chiral/cholesteric transition.

The pitch in the smectic phase is greater than 1 $\mu$m and preferably much greater, e.g. greater than layer thickness. The layer thickness, d, may be up to 15 $\mu$m.

Prior art chiral smectic devices have a smectic A phase between the cholesteric and S* phase. Alignment is assisted by slow cooling from the cholesteric phase. It was not possible to obtain uniform alignment without a smectic A phase. The present invention permits good device alignment without an SA phase being present. This arises because of the compensated or long cholesteric pitch in the cholesteric phase.

The value of Ps is at least 0.1 and preferably 1 or more nC/cm$^2$. All the chiral components may have substantial values of Ps and the same sense of Ps. Alternatively one or more components may have Ps values of opposite senses providing the net Ps is substantial.

For some materials the cooling is at a rate of between 0.05° and 2° C./minute within ±5° C. of the cholesteric to smectic phase transition. However, when the cholesteric pitch is large, i.e. the material is well compensated or is naturally of long pitch the device may be cooled as rapidly as is convenient, e.g. 20° C./minute or more.

The device may further include means for applying two d.c. voltages of opposite polarity to the electrode structures whereby the molecules of the mixture are forced to lie in one of two different positions depending on the polarity of applied voltage and switch between these two positions as the polarity is changed.

According to this invention a liquid material mixture for use in a tilted chiral smectic liquid crystal device comprises a material having a chiral smectic phase at normal device operating temperatures and a cholesteric phase at an elevated temperature, the mixture having a cholesteric pitch greater than 2 d in the cholesteric phase at least 0.1° C. above a cholesteric to smectic transition temperature, and a substantial polarization coefficient Ps, in the smectic phase.

Preferably the pitch in the cholesteric phase is much greater than 4 $\mu$m and ideally approaches infinite pitch.

The device ambient or operating temperature typically falls within the range of 0° to 40° C. although when used on equipment it may reach 100° C.

The mixture may include an amount of a pleochroic dye.

Use of chiral components in nematic liquid crystal material is well known. The addition of a chiral component imparts a twist direction to the nematic material director and results in a cholesteric material. The direction of this twist can either be clockwise or counterclockwise, i.e. right or left rotation. Adding two different chiral materials of opposite twist can result in zero twist depending upon the composition and temperature of the mixture. Some compounds can have molecules with both right and left rotatory power, these are optical isomers when the optical isomers are present in equal amounts a racemic mixture is formed which is indistinguisable from ordinary non-chiral liquid crystalline materials.

BRIEF DESCRIPTION OF THE DRAWINGS

One form of the invention will now be described, by way of example only, with reference to the accompanying drawings in which.

DETAILED DESCRIPTION OF PREFERRED EMBODIMENTS

Figure 1:
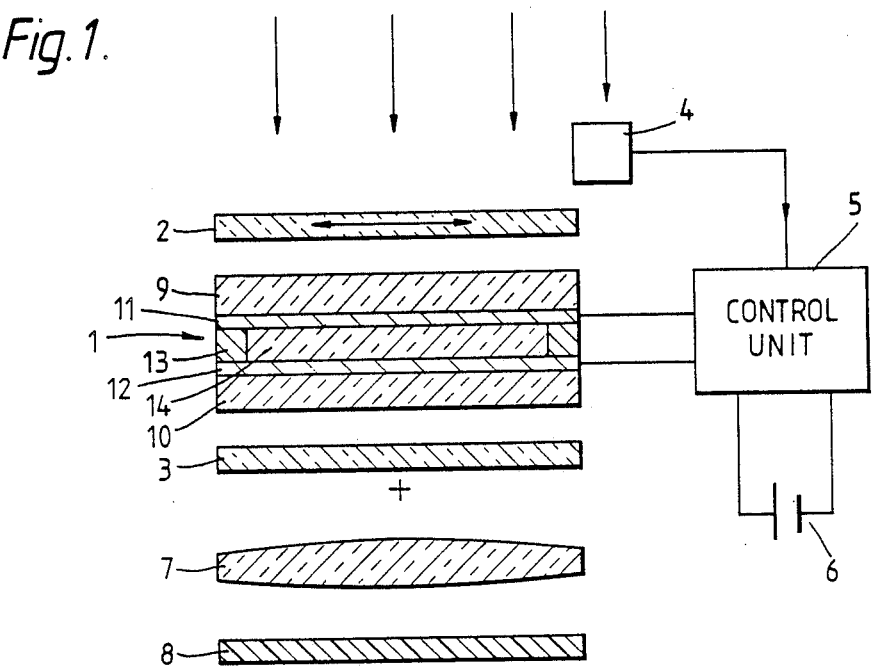
FIG. 1 is a sectional view of a liquid crystal shutter system for a film camera.

The shutter system of FIG. 1 comprises a liquid crystal cell 1 arranged between crossed first and second polarizers 2, 3, aligned as described below.

In front of the first polarizer 2 is a light sensor 4 e.g. a photo diode. Control of the cell 1 is from a control unit 5 which receives signals from the sensor 4 and voltage from a voltage source 6 e.g. a 12 volt battery. Behind the cell 1 is a lens system 7 focussing light onto a photographic film 8 or other detector, the cell 1 can be switched between light transmissive and opaque states as explained later.

The cell 1 comprises two glass walls 9, 10 carrying sheet electrodes 11, 12 e.g. 100 Å thick tin oxide. A spacer ring 13 seals a layer 14 of liquid crystal material between the walls 9, 10. Small strands (not shown) of glass fibres distributed throughout the layer may be used to improve the accuracy of cell wall spacing. A typical layer 14 thickness is 2 to 12 $\mu$m. Prior to assembly the walls 9, 10 are surface treated by spinning on a thin layer of polyamide or polyimide, drying and where appropriate curring; then buffing with a soft cloth (e.g. rayon) in a single direction R1, R2. As shown the directions R1, R2 are anti-parallel, i.e. parallel in the opposite direction but may be parallel in the same direction. This known treatment provides a surface alignment for liquid crystal molecules. The molecules align themselves along the rubbing direction R1, R2, and at an angle of about 2° to the surface. Alternatively SiOx may be obliquely evaporated onto walls to provide alignment.

Thus to expose the film 8 to a scene by flash light the cell 1 and polarizer 2, 3 forming a shutter is triggered open and shut by the sensor 4 and control unit 5 to correctly expose the film 8. Alternatively, if the cell 1 is used to protect e.g. a television phototube, the cell 1 would normally be in its transmissive state and switched to opaque if incident light was too great for the tube.

Figure 2A:
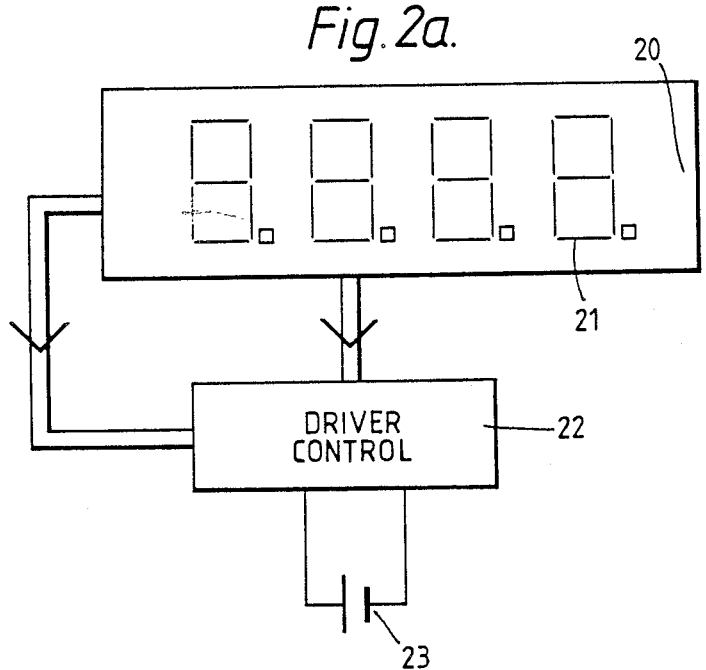
FIGS. 2a and 2b are front and side views of a four character eight bar display.
Figure 2B:
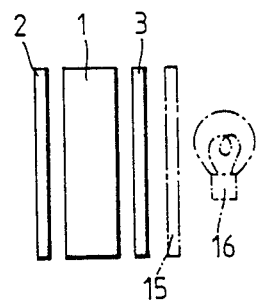

FIG. 2 shows a four digit eight-bar display 20. This comprises a liquid crystal cell provided with electrodes 21 shaped to provide a known eight-bar display as described in G.B. Patent Specification Nos. 2 009 219 and 2 031 010. Suitable voltages are switched by a driver control 22 from a battery 23 to display numbers from zero up to 9,999. The display 20 is constructed as in FIG. 1 with a cell arranged between two polarizers.

The digital display may be viewed by reflection of ambient light in which case a reflector 15 is arranged behind the display. Alternatively the display may be back lit e.g. by a tungsten bulb 16. In some cases the reflector 15 may be partly transmissive so that the display can be viewed both by reflective and transmitted light.

Figure 3A:
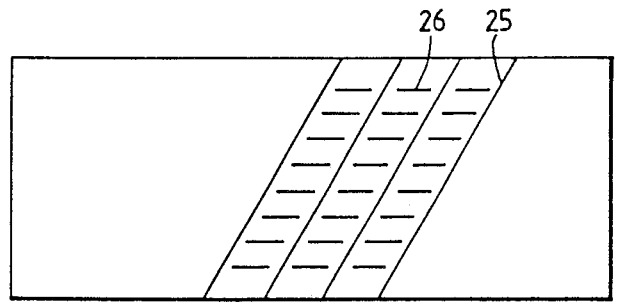
FIGS. 3a, b are respectively a stylised plan and sideview of a layer of tilted chiral smectic liquid crystal material.

Alignment and switching of the liquid crystal layer will now be described with reference to FIGS. 3, 4, 5. The layer 14 of liquid crystal material is a chiral smectic material e.g. smectic C*. A non-chiral smectic material forms itself into micro-layers 25 normal to the wall with molecules 26 lying normal to the microlayer. This is analogous to fibers in a fiber optic plate. Chiral smectic materials arrange themselves with the molecules 26 at a small angle to the normal of the micro layers 26 as shown in FIG. 3a. The wall surface alignment treatment provides a strong alignment to molecules in contact therewith.

As a result the molecules 26 align, at the wall surface, along a rubbing direction R and the micro layers 25 form at a typical angle of 70° to the rubbing direction.

Figure 5A:
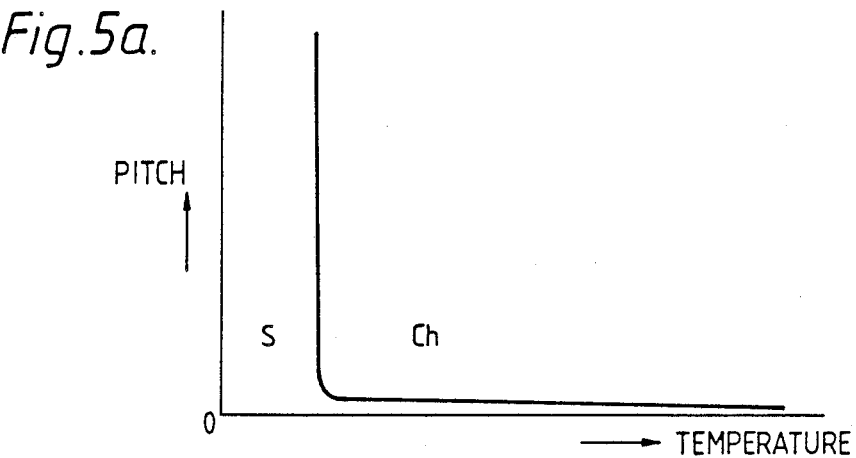
FIGS. 5a, b, c are graphs of cholesteric pitch versus temperature for various mixtures.

To provide a uniform alignment of both molecules 26 and microlayers 25 it is necessary to use a smectic material with a cholesteric phase at elevated temperatures. FIG. 5a shows a cholesteric pitch p versus temperature curve for a typical conventional smectic material with a cholesteric phase. As the temperature reduces very close to a cholesteric/smectic phase transition, pitch p increases towards infinity. Away from this transition cholesteric pitch becomes very small, typically much less than 1 μm.

Displays of the present invention have a long pitch in the cholesteric phase for at least 0.1° C. above this phase transition. Preferably this range is 5° C. and ideally occurs over the whole cholesteric temperature range. Within this range the minimum p is greater than 4 d, d being the layer thickness.

There are a number of ways of achieving the above material. For example combining one or more chiral components with laevo (left) cholesteric twist sense with one or more chiral components with dextro (right) cholesteric twist sense, with the proviso that none of the laevo components are the racemates of the dextro components. Such a mixture may be used by itself if it has the necessary smectic phases. Alternatively the chiral mixture may be added to a non-chiral or a racemate liquid crystal material, eg a smectic C host. Different chiral components may have different temperature/pitch characteristics. In this case it is necessary to ensure that the resultant pitch has the required value in the temperature range above the smectic/cholesteric phase transition.

When using chiral components of opposite twist sense it is necessary to ensure that the resultant mixture has the required spontaneous polarization value Ps. Thus all of the chiral components, regardless of their cholesteric twist sense, may have the same sense of S* polarization, i.e. their Ps add. Alternatively one or more of the chiral components may have the opposite sense of Ps providing the net Ps has a sufficient value.

Another way of achieving the above material is to use one or more chiral components with the same cholesteric twist sense and S* polarization sense but still satisfying the cholesteric pitch values noted above. Such a mixture may be used alone or in combination with a non-chiral or a racemate liquid crystal material, e.g. a $S_C$ host.

As a result of the long pitch in the cholesteric phase the material cools into the $S_C^*$ phase with uniform alignment caused by the cell wall treatment. The result is alignment as in FIG. 3.

The pitch in the smectic phase is arranged to be greater than about 1 μm and preferably very much greater.

Figure 5B:
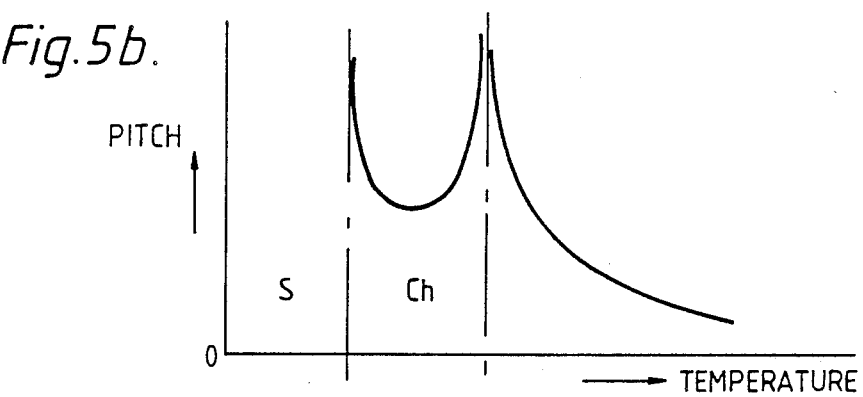

The compensation of pitch in the cholesteric phase is illustrated in FIGS. 5(a), (b), (c). FIG. 5(a) shows cholesteric pitch against temperature for a noncompensated material having a cholesteric to smectic transition. At this transition the pitch tends to infinity. The compensated material shown in FIG. 5(b) shows a pitch increase a few degrees above the transition temperature with a pitch reduction below. By suitable selection of materials this pitch increase can be made to occur even closer to the transition temperature as in FIG. 5(c), but a few degrees difference does not seem to affect the end result. Some materials, e.g. Examples 4, 5 below, show a long pitch cholesteric characteristic over the whole cholesteric temperature range with a single chiral dopant. These are inherently good materials as in FIG. 5(c) without the need for compensation as shown in FIG. 5(b).

Figure 3B:
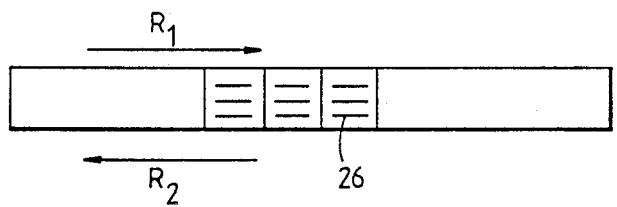

To obtain the uniform alignment of FIG. 3 the liquid crystal material in the cell is heated to about 5° C. above the smectic/cholesteric phase transition. It is then cooled at a typical rate of about 0.05° and 0.2° C. per minute within ±5° C. of the transition. In some cases the application of a d.c. voltage, e.g. 10 volts of appropriate polarity assists in obtaining uniform alignment during cooling. Additionally a material after cooling into the smectic phase can be slowly heated just into the cholesteric phase and recooled whilst an appropriate voltage pulse is maintained. When the uniform alignment of FIG. 3 is obtained the cell 1 is ready for use.

Liquid crystal molecules adopt one of two alignment direction D1, D2 depending on the polarity of an applied voltage. A typical voltage is ±10 volts. These two positions are seen in FIG. 4 in full D1 and broken lines D2. For this invention, not necessarily all chiral smectic displays, one of the two applied field D alignments is also the field OFF state. Rapid switching between the two states, when the d.c. pulses are applied, is due to the smectic ferro electric property of the material. Typically the cell can be switched between D1 and D2 in about 0.5 to 1 ms. The two different directions D1, D2 represent two different directions of Ps, often termed UP and DOWN directions. These two directions D1, D2 may be about 45° apart depending on the material composition.

The polarizer 2, or 3 is preferably aligned along the direction D which may be slightly different from direction R.

Figure 4:
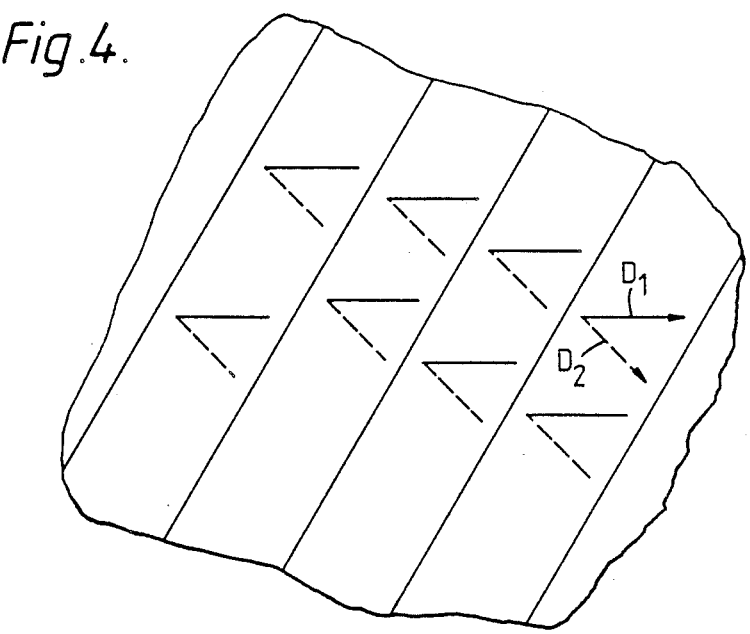
FIG. 4 is an enlarged view of part of FIG. 3 showing two switched states.

Because of the strong molecular alignment between crossed polarizers 2, 3, less than about 0.01% of light is transmitted through the shutter formed by the cell 1 and polarizers 2, 3 combination in it voltage OFF, i.e. the state in full lines in FIG. 4. When switched to the DOWN state the shutter is highly transmissive. This makes the cell of this invention very suitable for shutter systems. Also the contrast between UP and DOWN states gives enhanced eight-bar displays as in FIG. 2. Additionally the display has a wide angle of view.

If about 1% of a diochroic dye is incorporated into the liquid crystal material 14 only one polarizer is needed aligned parallel or perpendicular to one of the directions D1, D2. One example of a dye is BDH dye catalogue number D102 available from BDH, Poole, England. In this case angle between D1, D2 is preferably about 90°.

Example of materials: Mixtures can be prepared using the following components.

| | Chiral Components as described in G.B. Patent Application No. 8520715. | | | |
|---|---|---|---|---|
| Code | Structure | Absolute configuration of chiral group(s) | Sense of cholesteric twist | Sense of spontaneous polarisation |
| CC1 | $C_8H_{17}O$—⬡—⬡—$COOC^*HC_6H_{13}$ (Me) | S | L | (+) |
| CC2 | $C_8H_{17}O$—⬡—⬡—$COOC^*HC_6H_{13}$ (Me) | R | D | (−) |
| CC3 | $C_8H_{17}O$—⬡—⬡—COO—⬡(F)—2MB* | S | D | (+) |
| CC4 | 2MB*—⬡—⬡—COO—⬡(F)—2MB* | SS | D | (+) |
| CC5 | 2MB*—⬡—COO—⬡—2MB* | SS | D | (+) |
| CC6 | $C_8H_{17}$—⬡—⬡—COO—⬡—2MB* | S | D | (+) |
| CC7 | $C_8H_{17}O$—⬡—⬡—L*—⬡—L*$C_2H_5$ | SS | L | (+) |
| CC8 | $C_8H_{17}O$—⬡—⬡—L*$C_2H_5$ | S | L | (+) |
| CC9 | $C_6H_{13}C^*HCOO$—⬡—⬡—$COOC^*HC_6H_{13}$ (Me, Me) | | | |

-continued
| CC12 | 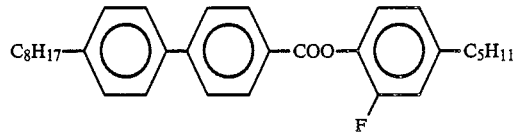 | D | (+) |
| CC13 | 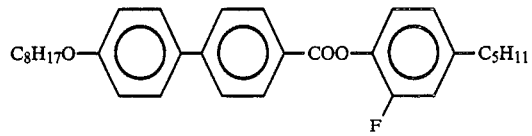 | D | (+) |
where 2MB*: —CH$_2$C*HC$_2$H$_5$ with Me substituent; and L* = —COOC*HCOO—
Non-Chiral Materials as in GB patent application No 8520715.
M1 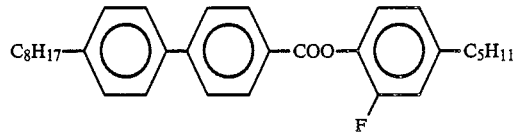
M2 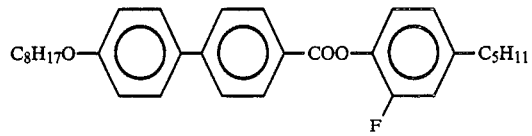
M3 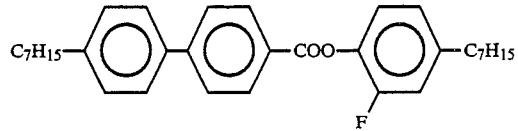
M4 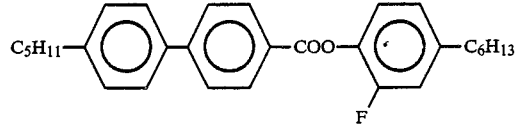
M5 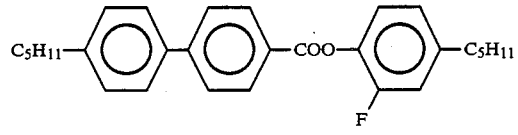
M6 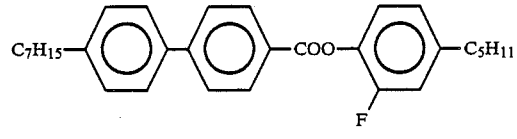
M7 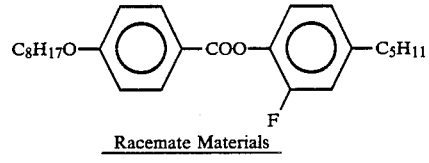
Racemate Materials
R1 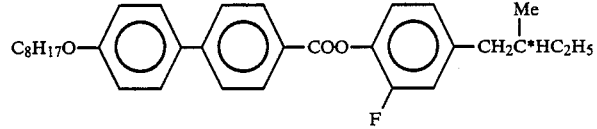
Sc Host Mixtures
| Code | Composition |
| --- | --- |
| H1:- | M1 + M2 + M3 (1:1:1) |

-continued

| | |
|---|---|
| H2:- | M2 + M3 + R1 (1:1:1) |
| H3:- | M1 + M6 + M4 (1:1:1) |
| H4:- | M2 + M3 + M5 (1:1:1) |

EXAMPLE 1

CM13:- 90% (90% H4+10% M7)+10% (49% CC1+51% CC4).

Isotropic 135° Cholesteric 52.3° $S_c^*$ - 15° $S_?$.

$S_?$ means an unknown smectic phase.

In a 6 μm cell, a 0 twist state was obtained for up to ~10° C. above the smectic A to cholesteric phase transition temperature. At 30° C. the spontaneous polarization of the mixture was 3.4 nC/cm² and the tilt angle (i.e. half the cone angle) was 21°.

EXAMPLE 2

CM15:- 15.9% (31.4% CC9+68.6% CC4)+94.1% H1.

Isotropic 135° Cholesteric 56.1° $S_c^*$ 20° Solid.

In a 6 μm cell, a π twist state was maintained for a few degrees Celcius above the smectic C* to cholesteric transition. The alignment was poor after initially cooling into the $S_c^*$ phase, however, by applying ~20 Vpk 10 Hz square wave-zero twist alignment in the smectic C* could be induced. Heating back up to just into the cholesteric phase and cooling with a d.c. field of appropriate sign then gave the desired alignment.

At 50° C. and 30° C. the spontaneous polarization of the mixture is 2 nC/cm² and 6.2 nC/cm², respectively.

EXAMPLE 3

Single cholesteric sense chiral component plus S host. LPC6:- 0.5% CC+99.5% (95% H4+5% M7).

Isotropic 152° cholesteric 76.8° $S_c^*$ <0 $S_?$.

In a 6 μm cell, a zero twist state can be achieved for up to 0.2° C. above the smectic C* to cholesteric transition temperature.

EXAMPLE 4

UCM 30:- 92.5% (85% H4+15% M7)+7.5% CC 12.

Isotropic 155.8° C., cholesteric 60.5 C, Sc* 15° $S_?$.

Figure 5C:
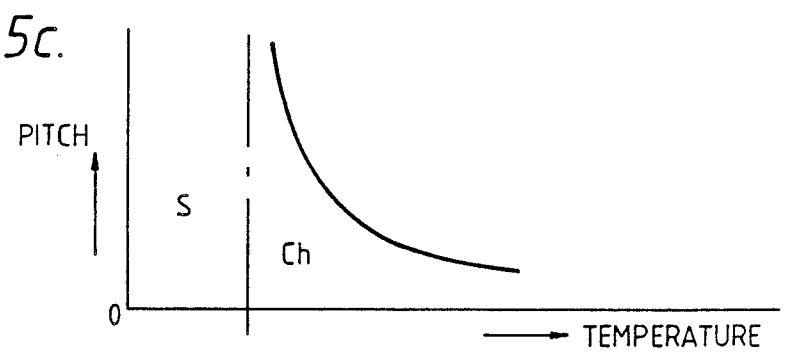

The cholesteric pitch-temperature curve is similar to FIG. 5(c). Ps=4.4 nC/cm² at 50.5° C. and 8.4 nC/cm² at 25° C. In a 6.2 μm thick cell a zero twist state can be achieved for ~7° C. above the Sc* to cholesteric phase transition temperature.

EXAMPLE 5

LPM13:- 72.5% H1+25% M7+2.5% CC13.

Isotropic 118° cholesteric 56.3° chiral smectic.

Ps=10 nC/cm² at 20° C. and 5 nC/cm² at 46° C.

This material shows zero twist in thee cholesteric phase.

We claim:

1. A liquid crystal device capable of being switched into two different liquid crystal molecular alignment states comprising:

two cell walls;

a layer of a tilted chiral smectic liquid crystal material contained between said two cell walls each of said cell walls including electrodes and surface treated to give homogeneous alignment direction to the liquid crystal molecules, the alignment directions being substantially parallel, said cell walls, said layer and electrodes forming a liquid crystal cell;

and two polarizers arranged one on each side of said liquid crystal cell with the optical axis of one polarizer substantially crossed with respect to the optical axis of the other polarizer and with the optical axis of one polarizer substantially parallel to said alignment direction on said cell wall, and the liquid crystal material having a tilted chiral smectic phase at normal device operating temperatures and a cholesteric phase at a higher temperature, with a cholesteric pitch of at least the layer thickness in the cholesteric phase at least 0.1° C. above the cholesteric to smectic transition temperature, a net spontaneous polarization coefficient greater than 0.1 nC/cm² and the following phase with increasing temperatures: chiral smectic - cholesteric - isotropic.

2. The device of claim 1 and further including
means for applying d.c. pulse of appropriate polarity to the elecrodes and change the state of the device between light transmissive and opaque states, means for measuring light falling on the device, and means for switching the device to an opaque state when measured light exceed a pre-determined value.

3. The device of claim 1 wherein the alignment directions on the cell walls are approximately parallel and in the same direction.

4. The device of claim 1 wherein the net spontaneous polarization coefficient PS is greater than 1.0 nC/cm².

5. The device of claim 1 wherein the smectic pitch is greater than 1 μm.

6. The device of claim 1 wherein the smectic pitch is greater than the liquid crystal layer thickness.

7. The device of claim 1 wherein the liquid crystal layer thickness d<15 μm.

8. The device of claim 7 wherein the cholesteric pitch p is greater than twice the liquid crystal layer thickness in the cholesteric phase at least 0.1° C. above the cholesteric to smectic phase transition.

9. The device of claim 7 wherein the cholesteric pitch p is greater than four times the liquid crystal layer thickness in the cholesteric phase at least 0.1° C. above the cholesteric to smectic phase transition.

10. The device of claim 1 wherein the device operating temperature is up to 100° C.

11. The device of claim 1 wherein the device operating temperature is up to 40° C.

12. The device of claim 1 wherein the angle between liquid crystal molecular alignment direction in one of said two alignment states is about 45° with respect to the molecular alignment direction in the other of said alignment states.

13. The device of claim 1 wherein the electrodes are formed to display digital values.

14. The display of claim 1 and further including a reflector for reflecting ambient light back through the liquid crystal layer and polarizers.

15. The device of claim 1 wherein one polarizer is replaced by an amount of a dichroic dye in the liquid crystal material.

* * * * *

UNITED STATES PATENT AND TRADEMARK OFFICE
CERTIFICATE OF CORRECTION

PATENT NO. : 4,969,719
DATED : November 13, 1990
INVENTOR(S) : Madeline J. BRADSHAW
              Edward P. RAYNES It is certified that error appears in the above-indentified patent and that said Letters Patent is hereby corrected as shown below:

Column 11, line 17, change "smectic A" to --smectic C*--.

Signed and Sealed this

Sixteenth Day of August, 1994

Attest:

BRUCE LEHMAN

*Attesting Officer*    *Commissioner of Patents and Trademarks*